(12) United States Patent
Gong (10) Patent No.: US 12,384,703 B2
(45) Date of Patent: *Aug. 12, 2025

(54) DISINFECTION LAMP WITH UNDERWATER LIGHT PROJECTION EFFECT

(71) Applicant: SHEN ZHEN LAMHO PHOTOELECTRICITY & TECHNOLOGY CO., LTD, Shenzhen (CN)

(72) Inventor: Yelin Gong, Fuzhou (CN)

(73) Assignee: SHEN ZHEN LAMHO PHOTOELECTRICITY & TECHNOLOGY CO., LTD, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/037,298

(22) Filed: Jan. 27, 2025

(65) Prior Publication Data

US 2025/0171336 A1    May 29, 2025

(51) Int. Cl.
| | |
|---|---|
| *C02F 1/68* | (2023.01) |
| *C02F 1/30* | (2023.01) |
| *C02F 103/42* | (2006.01) |
| *G01K 1/14* | (2021.01) |
| *G01K 7/16* | (2006.01) |

(52) U.S. Cl.
CPC ............ *C02F 1/688* (2013.01); *C02F 1/30* (2013.01); *G01K 1/14* (2013.01); *G01K 7/16* (2013.01); *C02F 2103/42* (2013.01); *C02F 2201/004* (2013.01); *C02F 2201/009* (2013.01); *C02F 2209/02* (2013.01); *C02F 2303/04* (2013.01)

(58) Field of Classification Search
None
See application file for complete search history.

(56) References Cited

U.S. PATENT DOCUMENTS

| | | | | |
|---|---|---|---|---|
| 429,384 | A | * | 6/1890 | Manwaring ............... C02F 1/42 206/0.5 |
| 2,826,484 | A | * | 3/1958 | Buehler .................. B01F 21/22 206/0.5 |
| 2,976,129 | A | * | 3/1961 | Buehler .................. C02F 1/688 206/0.5 |

(Continued)

*Primary Examiner* — Robert J Popovics
(74) *Attorney, Agent, or Firm* — Hemisphere Law, PLLC; Zhigang Ma (57) ABSTRACT

Disclosed is a disinfection lamp with an underwater light projection effect, comprising an upper lampshade, a lower lampshade, a lens lampshade and a tube for containing sustained release chlorine tablets, wherein a circuit board and a battery are arranged on the lens lampshade, a solar panel is mounted on the surface of the upper lampshade, a first light bead is arranged on the lower surface of the circuit board, a light diffuser is arranged at a position, corresponding to the first light bead, of a bottom of the lens lampshade, the first light bead is located in the light diffuser, and the lower lampshade is mounted at the bottom of the lens lampshade. The disinfection lamp can float on water, and the tube containing the sustained release chlorine tablets is immersed in water, such that a conventional water purification, sterilization and disinfection effect is realized.

11 Claims, 7 Drawing Sheets

(56) References Cited

U.S. PATENT DOCUMENTS

| | | | | |
|---|---|---|---|---|
| 3,130,124 A * | 4/1964 | Ferris | ................ | C09D 5/16 |
| | | | | 210/764 |
| 3,607,103 A * | 9/1971 | Kiefer | ................ | C02F 1/688 |
| | | | | 206/0.5 |
| 3,677,711 A * | 7/1972 | Bond | ................ | C02F 1/688 |
| | | | | 239/57 |
| 3,758,276 A * | 9/1973 | Bond et al. | ................ | E04H 4/1681 |
| | | | | 422/310 |
| 3,792,979 A * | 2/1974 | Clinton | ................ | B01F 21/22 |
| | | | | 206/0.5 |
| 4,217,331 A * | 8/1980 | Schaub | ................ | B01D 11/00 |
| | | | | D23/207 |
| 4,241,025 A * | 12/1980 | Grayson, IV | ................ | C02F 1/688 |
| | | | | 422/264 |
| D261,415 S * | 10/1981 | Yates | ................ | D23/207 |
| 4,337,136 A * | 6/1982 | Dahlgren | ................ | E04H 4/16 |
| | | | | 210/242.1 |
| 4,350,666 A * | 9/1982 | Klutts | ................ | B01F 21/22 |
| | | | | 4/DIG. 10 |
| 4,374,563 A * | 2/1983 | Alexander | ................ | B65D 71/10 |
| | | | | 206/0.5 |
| 4,416,854 A * | 11/1983 | Nielsen | ................ | C02F 1/46176 |
| | | | | 210/764 |
| 4,473,533 A * | 9/1984 | Davey | ................ | B01F 21/22 |
| | | | | D23/207 |
| 4,503,563 A * | 3/1985 | Johnson | ................ | F21S 9/02 |
| | | | | 362/267 |
| 4,630,634 A * | 12/1986 | Sasaki | ................ | C02F 1/688 |
| | | | | D23/207 |
| 4,670,149 A * | 6/1987 | Francis | ................ | B01D 17/04 |
| | | | | 210/615 |
| 4,702,270 A * | 10/1987 | King, Sr. | ................ | B01F 33/25 |
| | | | | 137/268 |
| 4,763,685 A * | 8/1988 | King, Sr. | ................ | B01F 21/22 |
| | | | | 137/268 |
| D297,857 S * | 9/1988 | Alexander | ................ | D23/207 |
| 4,798,707 A * | 1/1989 | Thomas | ................ | C02F 1/688 |
| | | | | 222/169 |
| 4,810,385 A * | 3/1989 | Hater | ................ | C02F 3/348 |
| | | | | 210/615 |
| 4,822,571 A * | 4/1989 | Nicholson | ................ | C02F 1/688 |
| | | | | 422/279 |
| 4,825,528 A * | 5/1989 | Nicholson | ................ | C02F 1/688 |
| | | | | 29/463 |
| 4,828,803 A * | 5/1989 | Nicholson | ................ | C02F 1/688 |
| | | | | 422/279 |
| 4,828,804 A * | 5/1989 | Nicholson | ................ | B01F 21/22 |
| | | | | 441/24 |
| 4,828,805 A * | 5/1989 | Connors | ................ | B01F 21/22 |
| | | | | 206/217 |
| 4,876,003 A * | 10/1989 | Casberg | ................ | B01F 21/00 |
| | | | | 206/5 |
| 4,880,547 A * | 11/1989 | Etani | ................ | C02F 1/688 |
| | | | | 210/764 |
| 4,900,432 A * | 2/1990 | Arnold | ................ | E04H 4/1263 |
| | | | | 210/91 |
| 4,917,868 A * | 4/1990 | Alexander | ................ | B01F 21/22 |
| | | | | 422/119 |
| D309,493 S * | 7/1990 | Casberg | ................ | D23/208 |
| 5,053,205 A * | 10/1991 | Taylor | ................ | C02F 1/688 |
| | | | | 210/205 |
| 5,055,183 A * | 10/1991 | Buchan | ................ | C02F 1/688 |
| | | | | 210/85 |
| 5,059,296 A * | 10/1991 | Sherman | ................ | C02F 1/46104 |
| | | | | 204/DIG. 5 |
| 5,059,316 A * | 10/1991 | Renton | ................ | B01F 21/22 |
| | | | | 210/242.1 |
| 5,064,624 A * | 11/1991 | King | ................ | E04H 4/1281 |
| | | | | 239/57 |
| 5,085,753 A * | 2/1992 | Sherman | ................ | C02F 1/4602 |
| | | | | 210/220 |
| 5,106,492 A * | 4/1992 | Distinti | ................ | E04H 4/1263 |
| | | | | 210/167.2 |
| 5,124,032 A * | 6/1992 | Newhard | ................ | C02F 1/688 |
| | | | | 210/206 |
| D328,333 S * | 7/1992 | Casberg | ................ | D23/208 |
| 5,128,031 A * | 7/1992 | Midkiff | ................ | B01D 35/05 |
| | | | | 210/167.2 |
| 5,152,610 A * | 10/1992 | Hallett | ................ | E04H 4/14 |
| | | | | 374/208 |
| 5,169,236 A * | 12/1992 | Iest | ................ | G01K 13/00 |
| | | | | 374/E1.008 |
| 5,350,509 A * | 9/1994 | Nelson | ................ | E04H 4/1281 |
| | | | | 210/232 |
| 5,407,567 A * | 4/1995 | Newhard | ................ | B01F 21/221 |
| | | | | 210/205 |
| 5,433,867 A * | 7/1995 | Kisner | ................ | C02F 1/688 |
| | | | | 210/167.11 |
| 5,476,116 A * | 12/1995 | Price | ................ | E04H 4/1281 |
| | | | | 422/279 |
| D371,824 S * | 7/1996 | Price | ................ | D23/207 |
| 5,681,110 A * | 10/1997 | Burzacchi | ................ | G01K 1/06 |
| | | | | 374/208 |
| 5,702,614 A * | 12/1997 | Taylor | ................ | C02F 1/66 |
| | | | | 210/242.1 |
| 5,795,459 A * | 8/1998 | Sweeney | ................ | C02F 1/4672 |
| | | | | 205/742 |
| 5,879,932 A * | 3/1999 | Van Erdewyk | ................ | C12M 23/38 |
| | | | | 435/307.1 |
| D412,198 S * | 7/1999 | Bonelli | ................ | D23/208 |
| 6,162,407 A * | 12/2000 | Pihl | ................ | E04H 4/1281 |
| | | | | 422/275 |
| 6,207,048 B1 * | 3/2001 | Bonelli | ................ | C02F 1/685 |
| | | | | 210/252 |
| 6,221,244 B1 * | 4/2001 | Yassin | ................ | E04H 4/1281 |
| | | | | 210/205 |
| 6,238,553 B1 * | 5/2001 | Lin | ................ | B01F 21/22 |
| | | | | 210/85 |
| 6,309,538 B1 * | 10/2001 | Khan | ................ | G01N 33/1886 |
| | | | | 210/85 |
| D451,978 S * | 12/2001 | Hood | ................ | D23/208 |
| D451,979 S * | 12/2001 | VanErdewyk | ................ | D23/208 |
| 6,340,431 B2 * | 1/2002 | Khan | ................ | G01N 33/1886 |
| | | | | 210/85 |
| D461,871 S * | 8/2002 | Flowers | ................ | D21/597 |
| 6,432,371 B1 * | 8/2002 | Oliver, Jr. | ................ | C02F 1/76 |
| | | | | 210/242.1 |
| 6,500,334 B1 * | 12/2002 | King | ................ | B01F 25/312 |
| | | | | 422/243 |
| 6,502,953 B2 * | 1/2003 | Hajianpour | ................ | F21S 4/20 |
| | | | | 362/186 |
| 6,508,929 B1 * | 1/2003 | Mercer | ................ | C02F 1/46104 |
| | | | | 205/742 |
| 6,562,242 B2 * | 5/2003 | King | ................ | B01F 25/316 |
| | | | | 210/764 |
| 6,582,668 B2 * | 6/2003 | Green | ................ | C02F 1/688 |
| | | | | 4/227.1 |
| 6,641,787 B1 * | 11/2003 | Siggins | ................ | E04H 4/1281 |
| | | | | 210/242.1 |
| D486,881 S * | 2/2004 | Pecci | ................ | D23/207 |
| 6,685,827 B2 * | 2/2004 | King | ................ | B01F 25/316 |
| | | | | 210/220 |
| 6,730,509 B2 * | 5/2004 | VanErdewyk | ................ | C12M 23/20 |
| | | | | 435/297.1 |
| 6,780,293 B2 * | 8/2004 | Munk | ................ | H10F 19/00 |
| | | | | 204/230.6 |
| 6,792,956 B2 * | 9/2004 | Bredo | ................ | E04H 4/1654 |
| | | | | 134/44 |
| 6,855,300 B2 * | 2/2005 | Cormier | ................ | C02F 1/688 |
| | | | | 441/24 |
| 6,908,551 B2 * | 6/2005 | King | ................ | B01F 25/316 |
| | | | | 210/205 |
| D510,404 S * | 10/2005 | Thompson | ................ | D23/207 |
| D512,481 S * | 12/2005 | Thompson | ................ | D23/208 |
| D517,643 S * | 3/2006 | Thompson | ................ | D23/208 |
| D518,142 S * | 3/2006 | Thompson | ................ | D23/208 |

(56) References Cited

U.S. PATENT DOCUMENTS

| | | | | |
|---|---|---|---|---|
| 7,014,780 B2 * | 3/2006 | King | B01F 25/312 | 210/205 |
| D518,554 S * | 4/2006 | Thompson | D23/208 | |
| D518,870 S * | 4/2006 | Thompson | D23/208 | |
| 7,037,038 B1 * | 5/2006 | Haski | B60L 53/38 | 405/60 |
| 7,059,540 B2 * | 6/2006 | King | B01F 21/22 | 239/34 |
| 7,060,190 B2 * | 6/2006 | King | C02F 1/688 | 210/764 |
| D526,043 S * | 8/2006 | Thompson | D23/208 | |
| D526,382 S * | 8/2006 | Thompson | D23/208 | |
| D528,929 S * | 9/2006 | Oliver, Jr. | D10/57 | |
| 7,101,475 B1 * | 9/2006 | Maaske | E04H 4/1263 | 210/167.2 |
| 7,207,701 B2 * | 4/2007 | Kennedy | F21S 8/00 | 362/477 |
| 7,309,421 B2 * | 12/2007 | Riley | C02F 1/001 | 210/167.2 |
| D559,943 S * | 1/2008 | Mercer | D23/207 | |
| 7,329,345 B2 * | 2/2008 | King | B01F 21/22 | 222/129 |
| 7,347,935 B2 * | 3/2008 | King | B01F 25/312 | 422/282 |
| 7,409,853 B2 * | 8/2008 | Biberger | G01N 33/1886 | 73/61.61 |
| 7,413,319 B2 * | 8/2008 | Longoria | G09F 13/24 | 362/267 |
| 7,452,461 B2 * | 11/2008 | Riley | E04H 4/1636 | 210/167.2 |
| 7,487,790 B2 * | 2/2009 | King | E04H 4/1281 | 137/268 |
| 7,504,025 B2 * | 3/2009 | Burgassi | E04H 4/1654 | 210/167.2 |
| 7,510,651 B1 * | 3/2009 | Auger | C02F 1/688 | 210/242.1 |
| 7,704,467 B2 * | 4/2010 | Hodgetts | C02F 1/688 | 137/268 |
| 7,841,916 B2 * | 11/2010 | Stetten | B01F 35/32055 | 210/620 |
| 7,922,982 B1 * | 4/2011 | Brennan | B01F 21/22 | 210/242.1 |
| D652,374 S * | 1/2012 | Mercer | D13/102 | |
| 8,728,406 B2 * | 5/2014 | Van Der Meijden | B01F 21/221 | 210/242.1 |
| 8,827,496 B2 * | 9/2014 | VanderSchuit | F21S 10/007 | 362/184 |
| 8,999,259 B2 * | 4/2015 | King | B01F 33/503 | 210/167.3 |
| 9,174,177 B2 * | 11/2015 | King, Jr. | C02F 1/76 | |
| 9,175,821 B2 * | 11/2015 | Adair | F21S 9/037 | |
| D745,947 S * | 12/2015 | Finley | D23/208 | |
| 9,206,952 B2 * | 12/2015 | Gold | B01F 21/22 | |
| D747,439 S * | 1/2016 | Byers | D23/208 | |
| 9,227,164 B2 * | 1/2016 | Sherman | B01F 21/15 | |
| 9,273,841 B2 * | 3/2016 | Philhower | F21S 9/037 | |
| D757,211 S * | 5/2016 | Slocum | D11/160 | |
| 9,352,236 B1 * | 5/2016 | Fernandez | A63H 23/14 | |
| 9,557,038 B2 * | 1/2017 | Blair | F21V 15/04 | |
| 9,631,388 B2 * | 4/2017 | Hui | C02F 1/4606 | |
| D788,878 S * | 6/2017 | Smith, Jr. | D23/207 | |
| D794,160 S * | 8/2017 | Hui | D23/207 | |
| 9,815,719 B2 * | 11/2017 | Sayre | C02F 1/688 | |
| 9,847,749 B2 * | 12/2017 | Kiani | F24S 20/02 | |
| D806,931 S * | 1/2018 | Hui | D26/102 | |
| D806,932 S * | 1/2018 | Hui | D26/102 | |
| D806,933 S * | 1/2018 | Hui | D26/102 | |
| 9,858,792 B2 * | 1/2018 | Fernandes | E04H 4/14 | |
| 9,862,626 B2 * | 1/2018 | King | E04H 4/1281 | |
| 9,951,940 B2 * | 4/2018 | Hui | F21V 31/00 | |
| 9,975,792 B2 * | 5/2018 | Thorgersen | C02F 1/688 | |
| 10,017,402 B2 * | 7/2018 | King | C02F 1/76 | |
| 10,029,932 B2 * | 7/2018 | King | B01F 21/22 | |
| D826,373 S * | 8/2018 | Kisner | D23/208 | |
| 10,047,535 B2 * | 8/2018 | King | B01F 21/22 | |
| 10,079,504 B2 * | 9/2018 | Hui | H02S 40/38 | |
| 10,094,129 B2 * | 10/2018 | He | C02F 1/688 | |
| 10,118,847 B2 * | 11/2018 | Howe | C02F 3/305 | |
| 10,119,287 B2 * | 11/2018 | King | C02F 1/688 | |
| 10,259,722 B2 * | 4/2019 | Braunberger | C02F 1/004 | |
| 10,337,200 B2 * | 7/2019 | King | E04H 4/1281 | |
| 10,385,582 B2 * | 8/2019 | Smith, Jr. | C02F 1/001 | |
| 10,472,264 B2 * | 11/2019 | Simonsen | B01F 33/503 | |
| D882,727 S * | 4/2020 | Lee | D23/207 | |
| 10,665,073 B1 * | 5/2020 | Richerson, Jr. | G03B 29/00 | |
| D887,658 S * | 6/2020 | Smith, Jr. | D32/31 | |
| 10,704,780 B1 * | 7/2020 | Ko | F21S 9/037 | |
| 10,710,912 B1 * | 7/2020 | Gomez | C02F 1/688 | |
| 10,717,055 B2 * | 7/2020 | Huang | B01J 4/001 | |
| 10,737,951 B2 * | 8/2020 | Miller | C02F 1/66 | |
| 10,787,831 B2 * | 9/2020 | Smith, Jr. | C02F 1/001 | |
| 10,794,075 B2 * | 10/2020 | Smith, Jr. | C02F 1/008 | |
| 10,914,091 B2 * | 2/2021 | King | B01F 21/22 | |
| 11,008,232 B2 * | 5/2021 | Waldek | C02F 1/46104 | |
| 11,008,235 B2 * | 5/2021 | King | B01F 33/503 | |
| 11,097,958 B2 * | 8/2021 | Miller | C02F 1/685 | |
| 11,124,436 B2 * | 9/2021 | King | C02F 1/688 | |
| 11,408,191 B2 * | 8/2022 | King | C02F 1/688 | |
| 11,447,406 B2 * | 9/2022 | King | B01F 21/22 | |
| 11,453,989 B2 * | 9/2022 | Negron | E02B 15/10 | |
| D969,269 S * | 11/2022 | Tran | D23/208 | |
| 11,492,276 B2 * | 11/2022 | King | B01F 21/22 | |
| 11,493,495 B2 * | 11/2022 | Witelson | B63B 35/00 | |
| D972,681 S * | 12/2022 | Ren | D23/207 | |
| D980,381 S * | 3/2023 | Pike | D23/207 | |
| 11,739,549 B2 * | 8/2023 | Jensen | E04H 4/1263 | 210/86 |
| D1,001,235 S * | 10/2023 | Foglia | D23/207 | |
| 11,813,379 B2 * | 11/2023 | Ke | A61L 9/20 | |
| 12,049,768 B2 * | 7/2024 | Gong | E04H 4/14 | |
| 12,181,348 B1 * | 12/2024 | Li | G01K 1/14 | |
| 2002/0020676 A1 * | 2/2002 | King | B01F 25/312 | 210/753 |
| 2002/0078990 A1 * | 6/2002 | Munk | C02F 1/4674 | 136/291 |
| 2002/0096198 A1 * | 7/2002 | Bredo | E04H 4/1654 | 210/167.25 |
| 2002/0100733 A1 * | 8/2002 | King | B01F 21/22 | 210/753 |
| 2002/0112742 A1 * | 8/2002 | Bredo | A47K 3/001 | 134/10 |
| 2002/0197197 A1 * | 12/2002 | Green | E04H 4/1281 | 422/275 |
| 2004/0069698 A1 * | 4/2004 | King | B01F 25/312 | 210/205 |
| 2004/0144699 A1 * | 7/2004 | Lin | G05D 21/02 | 210/85 |
| 2004/0168963 A1 * | 9/2004 | King | B01F 21/22 | 210/198.1 |
| 2004/0173542 A1 * | 9/2004 | Porat | E04H 4/1272 | 210/192 |
| 2004/0175311 A1 * | 9/2004 | Cormier | A61L 2/23 | 422/40 |
| 2005/0063858 A1 * | 3/2005 | Cormier | A61L 2/23 | 422/265 |
| 2005/0077374 A1 * | 4/2005 | King | B01F 21/22 | 239/42 |
| 2005/0126977 A1 * | 6/2005 | Carter | C02F 1/285 | 210/242.4 |
| 2005/0163684 A1 * | 7/2005 | Sherr | B01F 21/22 | 422/265 |
| 2005/0194296 A1 * | 9/2005 | Lin | G01N 27/4167 | 210/85 |
| 2005/0211613 A1 * | 9/2005 | King | E04H 4/1272 | 210/167.11 |
| 2005/0220169 A1 * | 10/2005 | McGowan-Scanlon | G01N 33/1886 | 374/E1.018 |

(56) References Cited

U.S. PATENT DOCUMENTS

| | | | |
|---|---|---|---|
| 2005/0279677 A1* | 12/2005 | Lin | C02F 1/688 210/85 |
| 2006/0060513 A1* | 3/2006 | Craig | E04H 4/1263 210/167.2 |
| 2006/0092630 A1* | 5/2006 | Kennedy | F21S 8/00 362/157 |
| 2006/0096905 A1* | 5/2006 | Burgassi | E04H 4/1263 210/242.1 |
| 2006/0102532 A1* | 5/2006 | Cadotte | E04H 4/1654 210/94 |
| 2006/0104720 A1* | 5/2006 | Haski | G05D 1/247 405/60 |
| 2006/0254968 A1* | 11/2006 | King | C02F 1/688 210/198.1 |
| 2007/0039859 A1* | 2/2007 | King | E04H 4/1636 210/97 |
| 2007/0119761 A1* | 5/2007 | King | E04H 4/1281 210/198.1 |
| 2007/0235380 A1* | 10/2007 | Cawein | E04H 4/1263 210/242.1 |
| 2007/0272622 A1* | 11/2007 | Mercer | C02F 1/76 210/754 |
| 2008/0217258 A1* | 9/2008 | Buchan | B01F 21/22 210/167.11 |
| 2009/0075538 A1* | 3/2009 | Stetten | B01F 31/44 441/136 |
| 2010/0196228 A1* | 8/2010 | Efird | E04H 4/1281 422/265 |
| 2011/0089121 A1* | 4/2011 | Van Der Meijden | B01F 21/221 222/130 |
| 2011/0132848 A1* | 6/2011 | Diaz | B01F 21/22 210/764 |
| 2011/0168235 A1* | 7/2011 | Rosa Clot | H10F 77/68 136/246 |
| 2013/0092634 A1* | 4/2013 | King | C02F 1/766 210/749 |
| 2013/0092635 A1* | 4/2013 | King | E04H 4/1209 210/749 |
| 2013/0206660 A1* | 8/2013 | Hui | C02F 1/4606 210/167.11 |
| 2014/0027358 A1* | 1/2014 | Sayre | C02F 1/688 424/641 |
| 2014/0110352 A1* | 4/2014 | King | C02F 1/505 222/173 |
| 2014/0124456 A1* | 5/2014 | King | C02F 1/766 210/764 |
| 2014/0166076 A1* | 6/2014 | Kiani | F24S 20/02 136/246 |
| 2014/0170036 A1* | 6/2014 | Sherman | B01F 21/15 422/256 |
| 2014/0175022 A1* | 6/2014 | King | B01F 21/22 210/749 |
| 2014/0205512 A1* | 7/2014 | King | E04H 4/1281 422/265 |
| 2015/0021243 A1* | 1/2015 | Herrington | C02F 1/4672 210/85 |
| 2015/0116987 A1* | 4/2015 | VanderSchuit | F21V 23/02 362/101 |
| 2015/0152662 A1* | 6/2015 | King | C02F 1/76 422/265 |
| 2015/0152663 A1* | 6/2015 | King | C02F 1/766 210/747.1 |
| 2015/0240510 A1* | 8/2015 | King | E04H 4/1281 210/85 |
| 2015/0322683 A1* | 11/2015 | Edwards | E04H 4/1281 210/86 |
| 2015/0323389 A1* | 11/2015 | Dayan | G01K 13/00 374/156 |
| 2015/0368128 A1* | 12/2015 | King | C02F 1/76 422/119 |
| 2016/0025287 A1* | 1/2016 | Philhower | F21S 8/022 362/183 |
| 2016/0072429 A1* | 3/2016 | Kiani | H02S 40/22 136/246 |
| 2017/0092096 A1* | 3/2017 | Fernandes | E04H 4/00 |
| 2017/0159927 A1* | 6/2017 | Hui | F21V 31/00 |
| 2017/0205035 A1* | 7/2017 | Blair | F21V 3/00 |
| 2017/0356209 A1* | 12/2017 | He | C02F 1/688 |
| 2018/0029906 A1* | 2/2018 | King | C02F 1/766 |
| 2018/0041068 A1* | 2/2018 | Hui | F21L 4/08 |
| 2018/0130328 A1* | 5/2018 | Fernandes | G08B 21/084 |
| 2018/0209160 A1* | 7/2018 | King | C02F 1/76 |
| 2018/0229919 A1* | 8/2018 | King | C02F 1/688 |
| 2018/0327291 A1* | 11/2018 | Simonsen | B01F 33/503 |
| 2019/0017668 A1* | 1/2019 | Heaton | F21V 21/08 |
| 2019/0022603 A1* | 1/2019 | Huang | C02F 1/688 |
| 2019/0048608 A1* | 2/2019 | Smith, Jr. | B01D 29/014 |
| 2019/0136557 A1* | 5/2019 | Jensen | E04H 4/1272 |
| 2019/0218114 A1* | 7/2019 | Braunberger | E04H 4/1263 |
| 2019/0257102 A1* | 8/2019 | King | C02F 1/688 |
| 2019/0257807 A1* | 8/2019 | Witelson | B63B 35/00 |
| 2019/0301186 A1* | 10/2019 | Smith, Jr. | C02F 1/008 |
| 2019/0301187 A1* | 10/2019 | Smith, Jr. | C02F 1/001 |
| 2019/0301188 A1* | 10/2019 | Smith, Jr. | E04H 4/1263 |
| 2019/0309914 A1* | 10/2019 | Blair | F42B 12/42 |
| 2019/0322557 A1* | 10/2019 | King | C02F 1/76 |
| 2020/0095140 A1* | 3/2020 | Waldek | C02F 1/4674 |
| 2020/0135000 A1* | 4/2020 | Asiri | G08B 21/084 |
| 2020/0240626 A1* | 7/2020 | Ko | F21S 9/037 |
| 2020/0399153 A9* | 12/2020 | King | E04H 4/1263 |
| 2021/0071436 A1* | 3/2021 | King | E04H 4/1281 |
| 2021/0198130 A1* | 7/2021 | King | C02F 1/76 |
| 2021/0262638 A1* | 8/2021 | Zhao | F21V 11/08 |
| 2021/0340786 A1* | 11/2021 | Zhang | G01K 1/14 |
| 2021/0371309 A1* | 12/2021 | Gallant | F21L 4/08 |
| 2021/0402043 A1* | 12/2021 | Ke | A61L 9/20 |
| 2022/0002171 A1* | 1/2022 | Correa Salas | C02F 1/46109 |
| 2022/0023460 A1* | 1/2022 | Lin | A61L 2/10 |
| 2022/0136907 A1* | 5/2022 | Pike | G01K 1/08 374/100 |
| 2022/0251862 A1* | 8/2022 | Jensen | E04H 4/1263 |
| 2022/0259083 A1* | 8/2022 | Marchand | C02F 1/50 |
| 2022/0315458 A1* | 10/2022 | Buchan | C02F 1/50 |
| 2022/0332613 A1* | 10/2022 | Feniger | C02F 1/688 |
| 2022/0412113 A1* | 12/2022 | Zhang | C02F 1/687 |
| 2023/0101118 A1* | 3/2023 | Rowhani | C02F 1/76 210/198.1 |
| 2023/0184598 A1* | 6/2023 | Zhang | G01K 13/026 374/208 |
| 2024/0141666 A1* | 5/2024 | Gong | F21V 33/00 |
| 2024/0142099 A1* | 5/2024 | Longoria | F21S 8/00 |
| 2024/0165285 A1* | 5/2024 | Chen | F21K 9/23 |
| 2024/0262722 A1* | 8/2024 | Stevens | E04H 4/1281 |

* cited by examiner

DISINFECTION LAMP WITH UNDERWATER LIGHT PROJECTION EFFECT

BACKGROUND OF THE INVENTION

Technical Field

The invention relates to the technical field of sterilization devices for swimming pools, in particular to a disinfection lamp with an underwater light projection effect.

Description of Related Art

It is commonly known that swimming pools are special places where people swim. To guarantee cleanliness and sanitation, water in swimming pools needs to be purified, sterilized and disinfected regularly to be kept clean and sanitary. When water in swimming pools is purified, sterilizing agents such as sustained release chlorine tablets are generally thrown into water, and the sustained release chlorine tablets are dissolved in water slowly to fulfill a sterilization and disinfection effect.

To improve the aesthetics and tidiness of swimming pools, the sustained release chlorine tablets, when used, are often contained in some devices such as a chlorine buoy and then placed in water rather than being directly thrown into swimming pools. However, existing such devices are only used for containing chlorine tablets and float on water. For the sake of aesthetics, light beads are installed on portions, floating on water, of some devices, and the sense of beauty is improved by means of light. However, such a sense of beauty is created above water and is limited, and particularly at night, the space under water in swimming pools is still completely dark. So existing products cannot provide better experience for users.

BRIEF SUMMARY OF THE INVENTION

In view of the abovementioned defects in the prior art, the objective of the invention is to provide a disinfection lamp with an underwater light projection effect.

To fulfill the above objective, the invention adopts the following technical solution:

A disinfection lamp with an underwater light projection effect comprises an upper lampshade, a lower lampshade, a lens lampshade and a tube for containing sustained release chlorine tablets, wherein a circuit board and a battery electrically connected to the circuit board are arranged on the lens lampshade, a solar panel is mounted on a surface of the upper lampshade and electrically connected to the circuit board, the upper lampshade covers the lens lampshade and is in seal connection with the lens lampshade, a first light bead is arranged on a lower surface of the circuit board, a light diffuser is arranged at a position, corresponding to the first light bead, of a bottom of the lens lampshade, the first light bead is located in the light diffuser, the lower lampshade is mounted at the bottom of the lens lampshade and wraps around the light diffuser, an exhaust gap is reserved between the lower lampshade and the lens lampshade, the tube is detachably mounted at a bottom of the lower lampshade, and water holes are formed in the tube and the lower lampshade; water infiltrates into the lower lampshade by means of the water holes in the lower lampshade to remove part of air in the lower lampshade to greatly reduce the buoyancy, such that the situation where the whole disinfection lamp loses balance and skews in water because the center of gravity the disinfection lamp is instable is avoided; water comes in contact with the sustained release chlorine tablets by means of the water holes in the tube, such that chlorine water is released to purify water.

Preferably, a reflection cup is arranged upside down in the lower lampshade and located below the light diffuser, and an outer end surface of the reflection cup is a reflecting surface, such that light refracted out of the light diffuser is reflected by the reflection cup to be diffused around.

Preferably, second light beads are arranged on the circuit board and face the upper lampshade, the lower lampshade is a scutate light diffuser, the first light bead and the second light beads are colorful RGB light beads, and a diamond pattern is arranged on the surface of the upper lampshade.

Preferably, foam is mounted around the lens lampshade.

Preferably, the lower lampshade is detachably mounted at the bottom of the lens lampshade.

Preferably, first lumps are arranged along an opening of the lower lampshade, a first socket allowing the opening of the lower lampshade to be inserted therein is arranged at the bottom of the lens lampshade, L-shaped first slots are formed in a wall of the first socket, the opening of the lower lampshade is inserted into the first socket and is rotated to lock the first lumps in the first slots, and exhaust gaps are reserved between the first lumps and the first slots.

Preferably, second lumps are arranged along an end opening of the tube, a second socket allowing the end opening of the tube to be inserted therein is arranged at the bottom of the lower lampshade, L-shaped second slots are formed in a wall of the second socket, and the end opening of the tube is inserted into the second socket and is rotated to lock the second lumps in the second slots.

Preferably, the tube comprises two semi-cylinders, one ends of the semi-cylinders are connected by means of a bent portion, and the other ends of the semi-cylinders are connected by means of hasps.

Preferably, lower ends of the semi-cylinders are sleeved with a cover, and receding holes are formed in positions, corresponding to the water holes, of the cover.

Preferably, the disinfection lamp with an underwater light projection effect further comprises a water temperature probe, wherein the water temperature probe is mounted on the lens lampshade or detachably mounted on the lens lampshade or the lower lampshade, a display screen for displaying a temperature value is inlaid in the upper lampshade, the upper lampshade corresponding to the display screen is transparent, and the water temperature probe and the display screen are electrically connected to the circuit board.

Preferably, in a case where the water temperature probe is fixedly mounted on the lens lampshade, a probe portion of the water temperature probe is arranged at the bottom of the lens lampshade and located in the lower lampshade.

Preferably, in a case where the water temperature probe is detachably mounted on the lens lampshade, the water temperature probe is connected to a first connecting base mounted in the first socket; in a case where the water temperature probe is detachably mounted in the lower lampshade, the water temperature probe is connected to a second connecting base mounted in the second socket; third lumps are arranged on a periphery of the first connecting base and a periphery of the second connecting base, and by rotation, the third lumps on the first connecting base are respectively clamped in the first slots, and the third lumps on the second connecting base are clamped in the second slots.

Preferably, a mounting rod is hinged to each of the first connecting base and the second connecting base, a mounting groove for fixing and mounting the water temperature probe is formed in the mounting rod, the water temperature probe is fixed and mounted in the mounting groove, and the probe portion of the water temperature probe is arranged outside the mounting groove.

Preferably, a receiving groove is formed in a position, corresponding to the mounting rod, of each of the first connecting base and the second connecting base, the water temperature probe is rotated to be received in the receiving groove, and a grip portion to be held by users is arranged on an end surface of the mounting rod.

By adopting the above technical solution, the disinfection lamp can float on water, and the tube containing the sustained release chlorine tablets is immersed in water, such that a conventional water purification, sterilization and disinfection effect is realized; the portion floating on water adopts an integrated design, such that the waterproofness is improved; and a sensory effect of underwater light projection and a solar power generation function are added, such that the functions of the disinfection lamp are diversified in many aspects, and a more gorgeous visual impression can be provided during water purification, thus bringing better product experience to users.

DETAILED DESCRIPTION OF THE INVENTION

To gain a better understanding of the objectives, technical solutions and advantages of the invention, the invention is described in further detail below in conjunction with accompanying drawings and embodiments. It should be understood that the specific embodiments described below are merely used to explain the invention and are not used to limit the invention.

In the description of the invention, it should be understood that terms such as "central", "longitudinal", "transverse", "length", "width", "thickness", "upper", "lower", "front", "back", "left", "right", "vertical", "horizontal", "top", "bottom", "inner", "outer", "clockwise" and "anticlockwise" are used to indicate directional or positional relations based on the accompanying drawings merely for the purpose of facilitating and simplifying the description of the invention, do not indicate or imply that devices or elements referred to must be in a specific direction or be configured and operated in a specific direction, and thus should not be construed as limitations of the invention. In addition, the terms "first" and "second" are merely for the purpose of description and should not be construed as indicating or implying relative importance or implicitly indicating the number of technical features referred to. Therefore, a feature defined by "first" or "second" may explicitly or implicitly indicate the inclusion of one or more said features. In the description of the invention, "multiple" refers to two or more, unless otherwise expressly and specifically defined.

In the description of the invention, it should be noted that unless otherwise expressly stated and defined, terms such as "mount", "link" and "connect" should be broadly understood. For example, "connect" may refer to fixed connection, detachable connection or integrated connection; or, mechanical connection or electrical connection; or, direct connection, indirect connection by means of an intermediate medium, or internal connection or interaction between two elements. Those ordinarily skilled in the art can appreciate the specific meanings of these terms in the invention as the case may be.

As shown in FIGS. 1-7, this embodiment provides a disinfection lamp with an underwater light projection effect, comprising an upper lampshade 1, a lower lampshade 2, a lens lampshade 3 and a tube 4 for containing sustained release chlorine tablets, wherein a circuit board 5 and a battery 6 electrically connected to the circuit board 5 are arranged on the lens lampshade 3, a solar panel 7 is mounted on the surface of the upper lampshade 1 and electrically connected to the circuit board 5, the upper lampshade 1 covers the lens lampshade 3 and is in seal connection with the lens lampshade 3, a first light bead 8 is arranged on the lower surface of the circuit board 5, a light diffuser 9 is arranged at a position, corresponding to the first light bead 8, of the bottom of the lens lampshade 3, the first light bead 8 is located in the light diffuser 9, the lower lampshade 2 is mounted at the bottom of the lens lampshade 3 and wraps around the light diffuser 9, an exhaust gap is reserved between the lower lampshade 2 and the lens lampshade 3, the tube 4 is detachably mounted at the bottom of the lower lampshade 2, and water holes 10 are formed in the tube 4 and the lower lampshade 2; water infiltrates into the lower lampshade 2 by means of the water holes 10 in the lower lampshade 2 to remove part of air in the lower lampshade to greatly reduce the buoyancy, such that the situation where the whole disinfection lamp loses balance and skews in water because the center of gravity the disinfection lamp is instable is avoided; water comes in contact with the sustained release chlorine tablets by means of the water holes 10 in the tube 4, such that chlorine water is released to purify water.

In this embodiment, the disinfection lamp can float on water, and the tube 4 containing the sustained release chlorine tablets is immersed in water, such that a conventional water purification, sterilization and disinfection effect is realized; the portion floating on water adopts an integrated design, such that the waterproofness is improved; and a sensory effect of underwater light projection and a solar power generation function are added, such that the functions of the disinfection lamp are diversified in many aspects, and a more gorgeous visual impression can be provided during water purification, thus bringing better product experience to users. Wherein, after the first light bead 8 is turned on, because the lower lampshade 2 is immersed in water under the action of water entering the lower lampshade 2, light emitted by the first light bead 8 will be directly projected underwater, so corresponding light will be emitted underwater, and particularly, when water is purified at night, a gorgeous scene will be created for a swimming pool by means of the light, thus improving the sense of beauty of the atmosphere; when sunlight is available, the solar panel 7 can generate power to charge the battery 6 to ensure that the light bead can emit light normally, and manual charging is avoided, thus improving convenience.

In specific use, first, the sustained release chlorine tablets are placed in the tube 4 one by one; next, the tube 4 is mounted on the lower lampshade 2 and then directly placed in water, and water is gradually guided into the tube 4 via the water holes 10 formed in the tube 4 and comes in contact with the sustained release chlorine tablets, such that water in a swimming pool is purified; at the same time, water gradually enters the lower lampshade 2 via the water holes 10 formed in the lower lampshade 2, and air is discharged out of the lower lampshade 2 via the exhaust gap, so the lower lampshade 2 sinks into water; in the purification process, the first light bead 6 is turned on, and light emitted by the first light bead 8 is refracted out of the lower lampshade 2, projected into the swimming pool and then reflected by the wall of the swimming pool, such that a more gorgeous lighting effect can be created. Internal power is provided mainly by the battery 6, and the solar panel 7 arranged outside the upper lampshade 1 generates power by means of sunlight to charge the battery 6, wherein because the solar panel 7 is directly arranged outside the upper lampshade 1, sunlight will not be blocked by materials on the upper lampshade 1 and can be converted into electric energy to the maximum extent. When the sustained release chlorine tablets 200 in the tube 4 are used out, the tube 4 can be directly detached, and new sustained release chlorine tablets are placed in the tube 4 to be used again.

Figure 3:
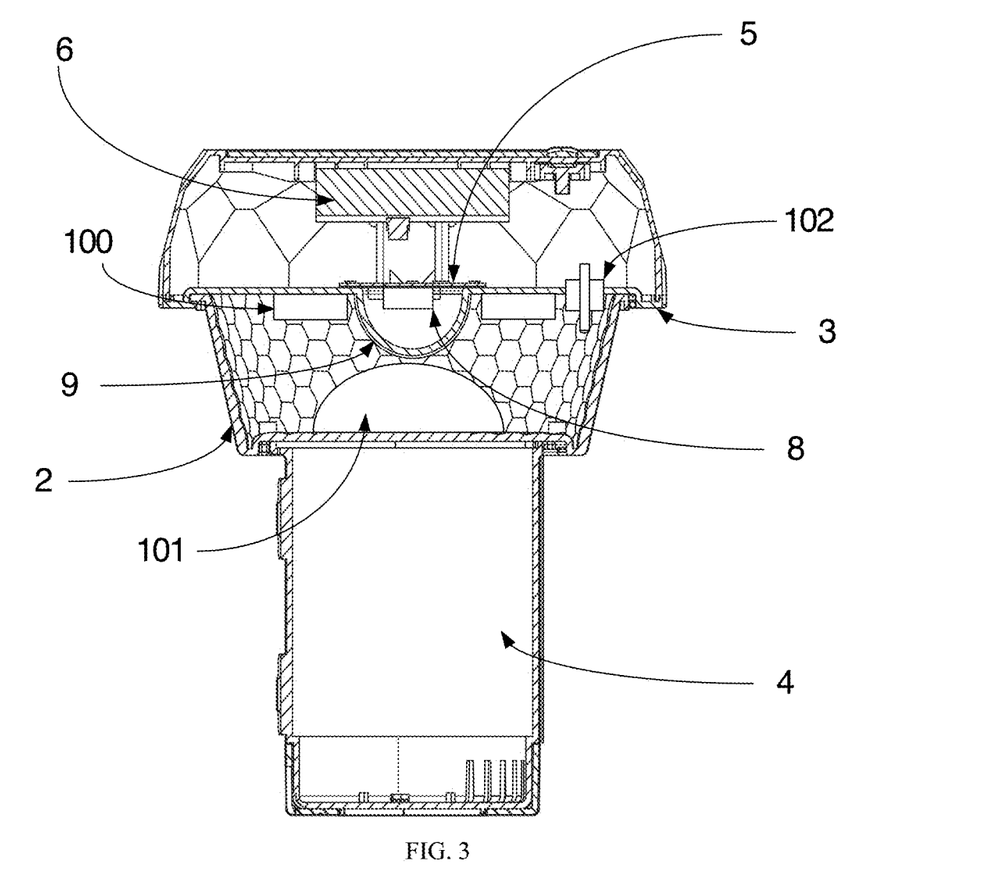
FIG. 3 is a sectional view according to one embodiment of the invention.

Further, in this embedment, a reflection cup 101 is arranged upside down in the lower lampshade 2 and located below the light diffuser, and an outer end surface of the reflection cup 101 is a reflecting surface, such that light refracted out of the light diffuser 9 is reflected by the reflection cup 101 to be diffused around, thus improving the underwater light diffusion effect.

Further, to improve the lighting effect, in this embodiment, second light beads 11 are arranged on the circuit board 5 and face the upper lampshade 1, and the second light beads 11 can project corresponnd light above water, such that corresponding light can be presented both underwater and above water, thus improving the sense of beauty.

Further, in this embodiment, foam 100 is mounted around the lens lampshade 3. By means of the foam 100, the buoyancy can be improved to contain more sustained release chlorine tablets under the precondition of reducing the product size, the transportation cost and the material cost.

Further, to guarantee the gorgeousness and diversity of light projection, in this embodiment, the lower lampshade 2 is a scutate light diffuser, a striped lens, or other lens light-diffusion lampshades with a lighting effect, the first light bead 8 and the second light beads 11 are colorful RGB light beads or light beads with the same effect, and a diamond pattern or other patterns are arranged on the surface of the upper lampshade 1, such that light coming out of the upper lampshade 1 is more gorgeous and colorful.

Figure 1:
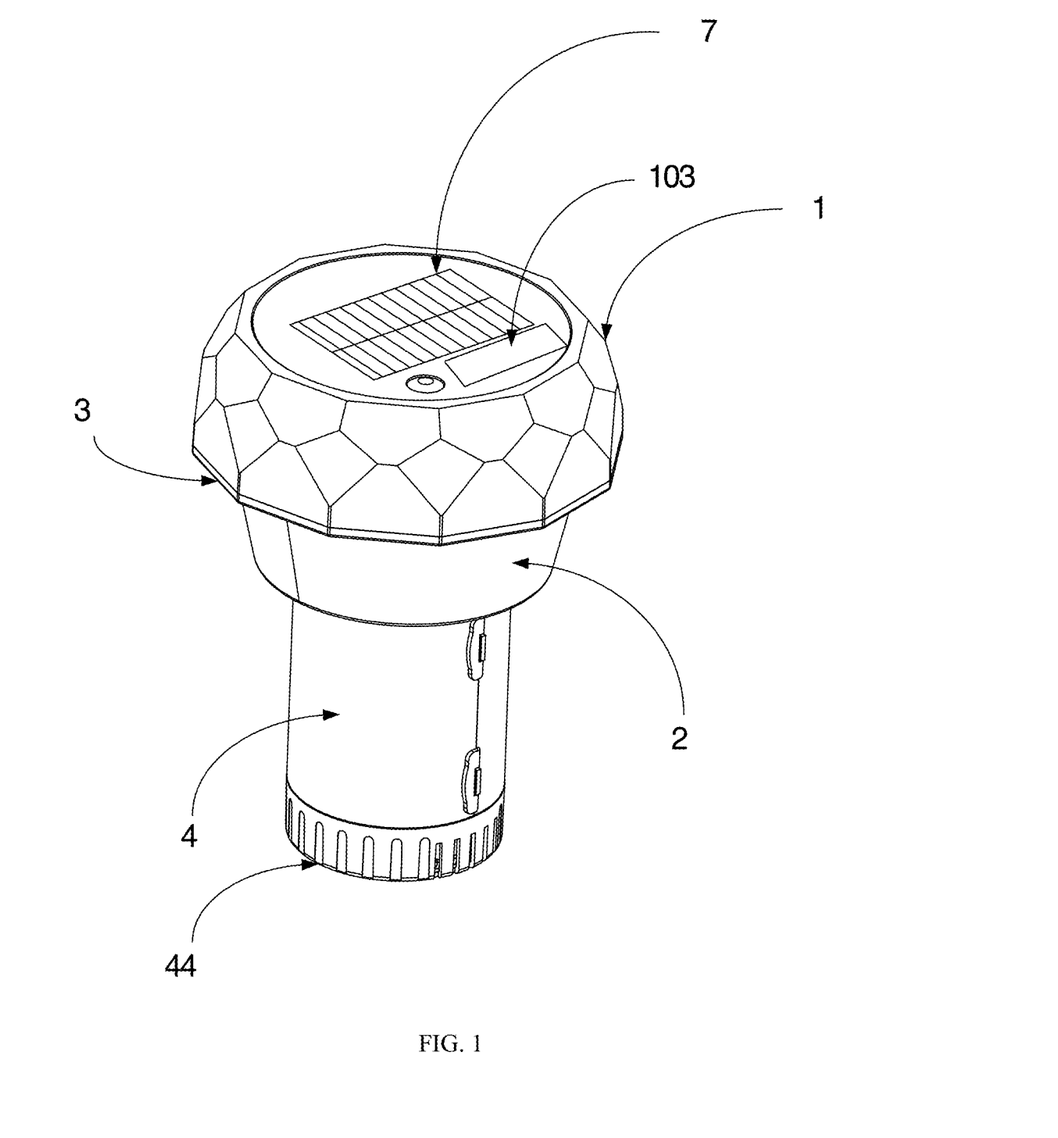
FIG. 1 is a schematic structural view according to one embodiment of the invention.
Figure 2:
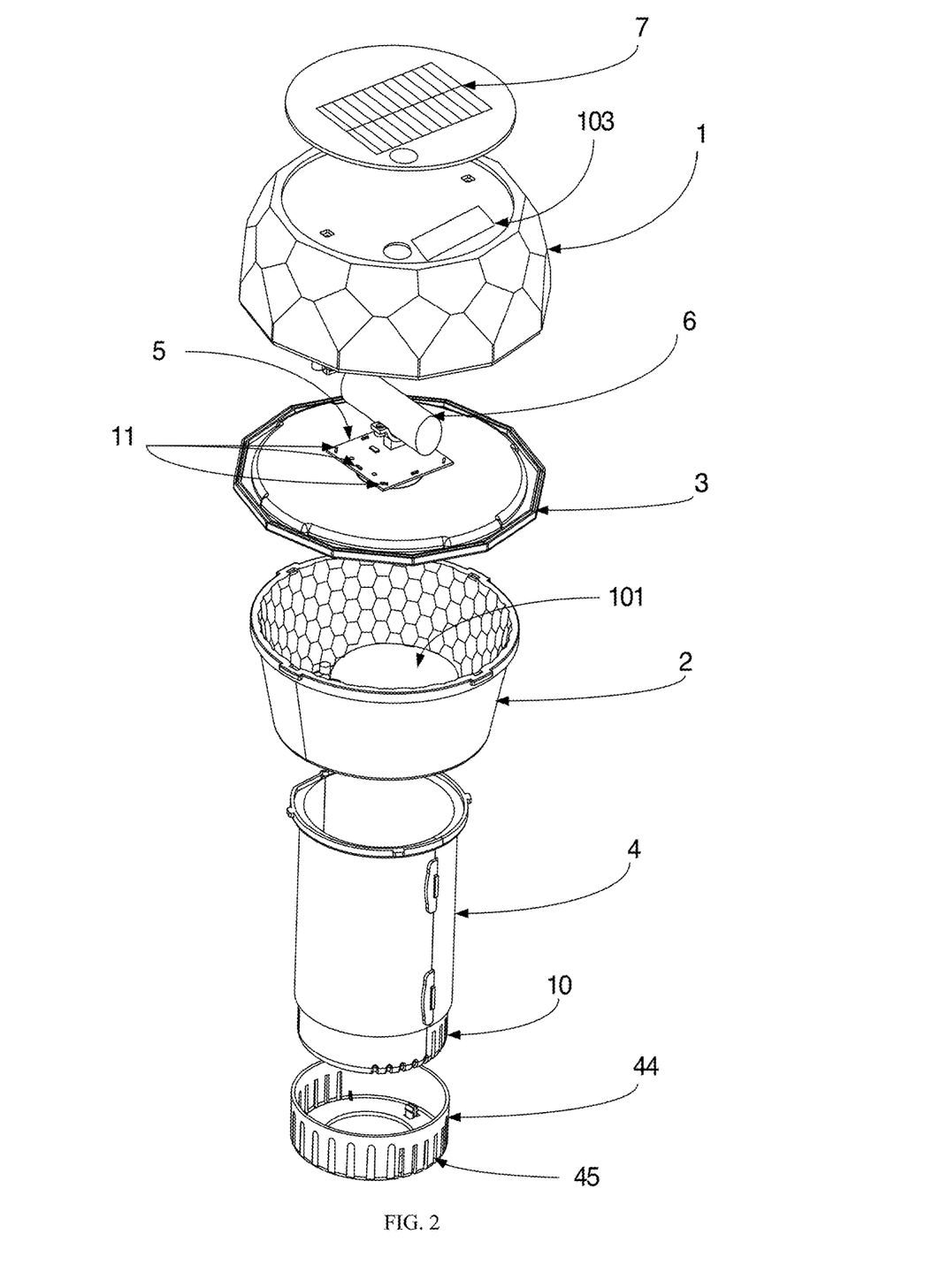
FIG. 2 is an exploded structural view according to one embodiment of the invention.
Figure 4:
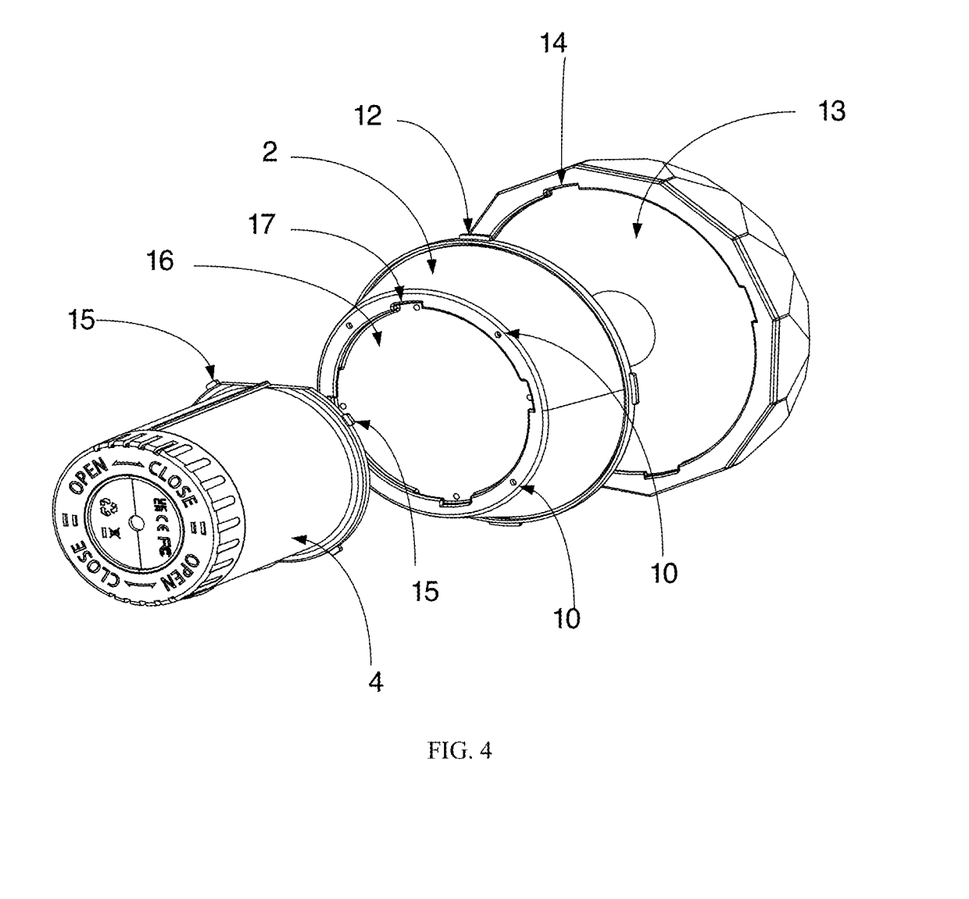
FIG. 4 is a disassembled structural view according to one embodiment of the invention.

Further, as for the installation of the lower lampshade 2, in this embodiment, the lower lampshade 2 is detachably mounted at the bottom of the lens lampshade 3, such that various lower lampshades 2 can be used to satisfy the requirements of customers. As for the specific assembly structure of the lower lampshade 2, first lumps 12 are arranged along an opening of the lower lampshade 2, a first socket 13 allowing the opening of the lower lampshade 2 to be inserted therein is arranged at the bottom of the lens lampshade 3, L-shaped first slots 14 are formed in the wall of the first socket 13, the opening of the lower lampshade 2 is inserted into the first socket 13 and is rotated to lock the first lumps 12 in the first slots 14, and exhaust gaps are reserved between the first lumps 12 and the first slots 14. Of course, the lower lampshade 2 may be threadedly mounted at the bottom of the lens lampshade 3.

Further, as for the detachable assembly between the tube 4 and the lower lampshade 2, second lumps 15 are arranged along an end opening of the tube 4, a second socket 16 allowing the end opening of the tube 4 to be inserted therein is arranged at the bottom of the lower lampshade, L-shaped second slots 17 are formed in the wall of the second socket 16, and the end opening of the tube 4 is inserted into the second socket 16 and is rotated to lock the second lumps 15 in the second slots 17. Of course, the tube 4 and the lower lampshade 2 may be threadedly assembled.

Figure 5:
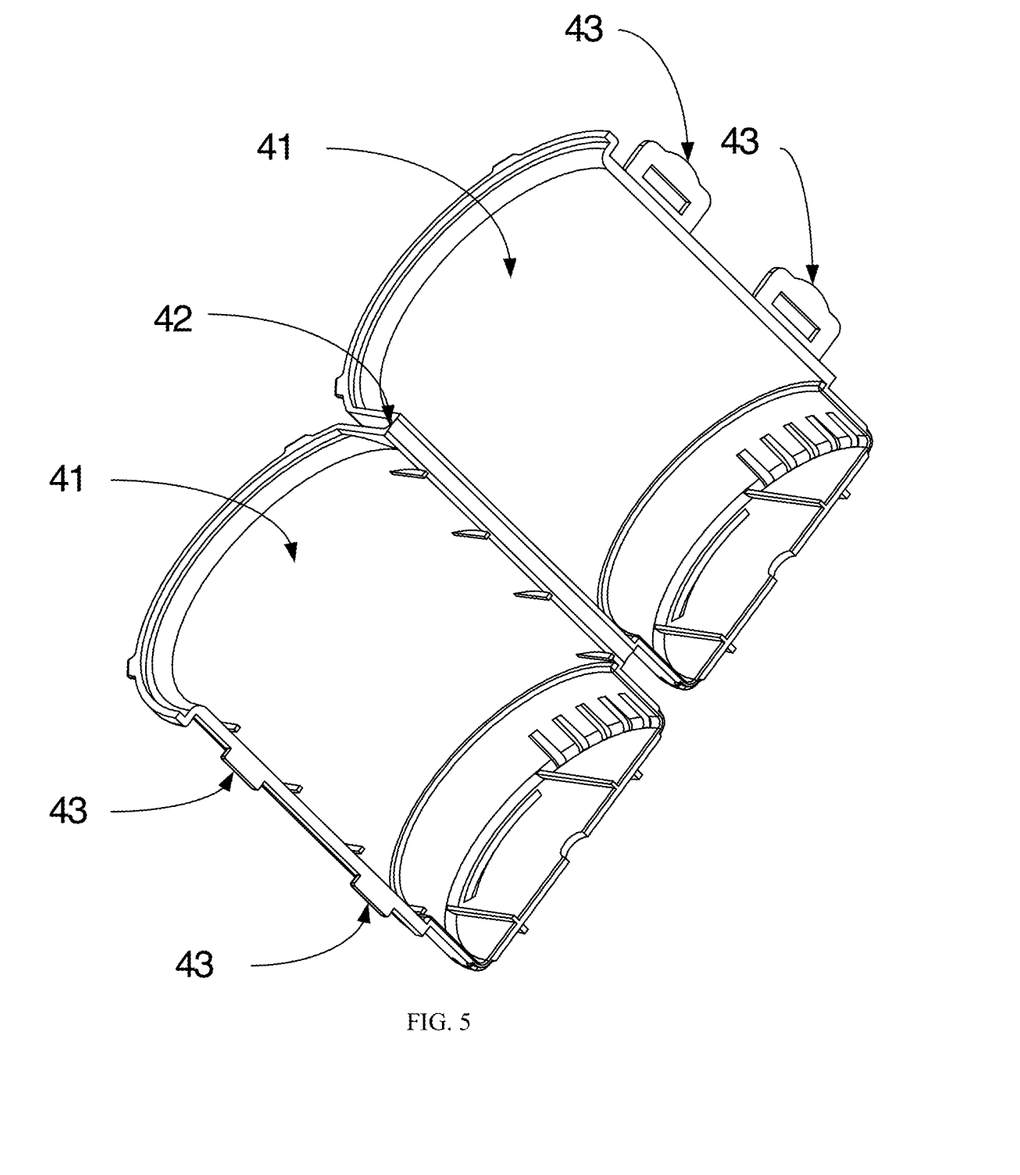
FIG. 5 is a schematic structural view of a tube according to one embodiment of the invention.

Further, as for the structure of the tube 4, the tube 5 comprises two semi-cylinders 41, one ends of the semi-cylinders 41 are connected by means of a bent portion 42, the other ends of the semi-cylinders 41 are connected by means of hasps 43, lower ends of the semi-cylinders 41 are sleeved with a cover 44, receding holes 45 are formed in positions, corresponding to the water holes 10, of the cover 44, and the bent portion 42 may be formed directly by thinning a flexible material such as plastic.

Further, the disinfection lamp in this embodiment may also function as an underwater temperature gauge, and in this case, the disinfection lamp further comprises a water temperature probe 102, which may be mounted in various ways. Specifically, the water temperature probe 102 is mounted on the lens lampshade 3 or detachably mounted on the lens lampshade 3 or the lower lampshade 2. A display screen 103 for displaying the temperature value is inlaid in the upper lampshade 1, the upper lampshade corresponding to the display screen is transparent, and the water temperature probe 102 and the display screen 103 are electrically connected to the circuit board 5. In this way, the temperature of water can be detected in real time by means of the water temperature probe 102 stretching into water and displayed by the display screen 103. The principle of the water temperature probe 102 is based on the detection principle of an NTC temperature sensor, which is a conventional principle and will not be detailed in this embodiment.

In specific use, there are the following cases for the water temperature probe:

First, as shown in FIG. 3, in a case where the water temperature probe 102 is fixedly mounted on the lens lampshade 3, a probe portion of the water temperature probe 102 is arranged at the bottom of the lens lampshade 3 and located in the lower lampshade 2.

Figure 6:
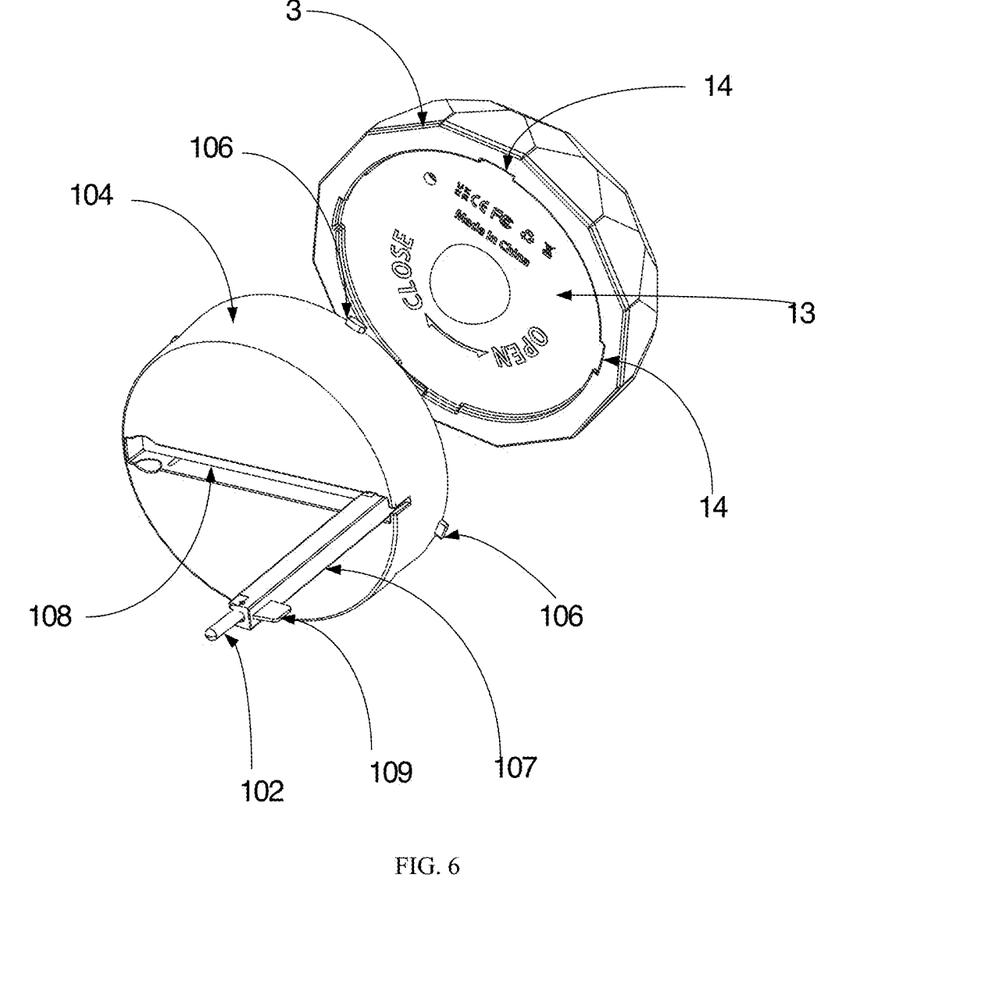
FIG. 6 is a schematic structural view in a case where a water temperature probe is mounted on a first connecting base according to one embodiment of the invention.

Second, in a case where the water temperature probe 102 is detachably mounted on the lens lampshade 3, the water temperature probe 102 is connected to a first connecting base 104 mounted in the first socket 13.

Figure 7:
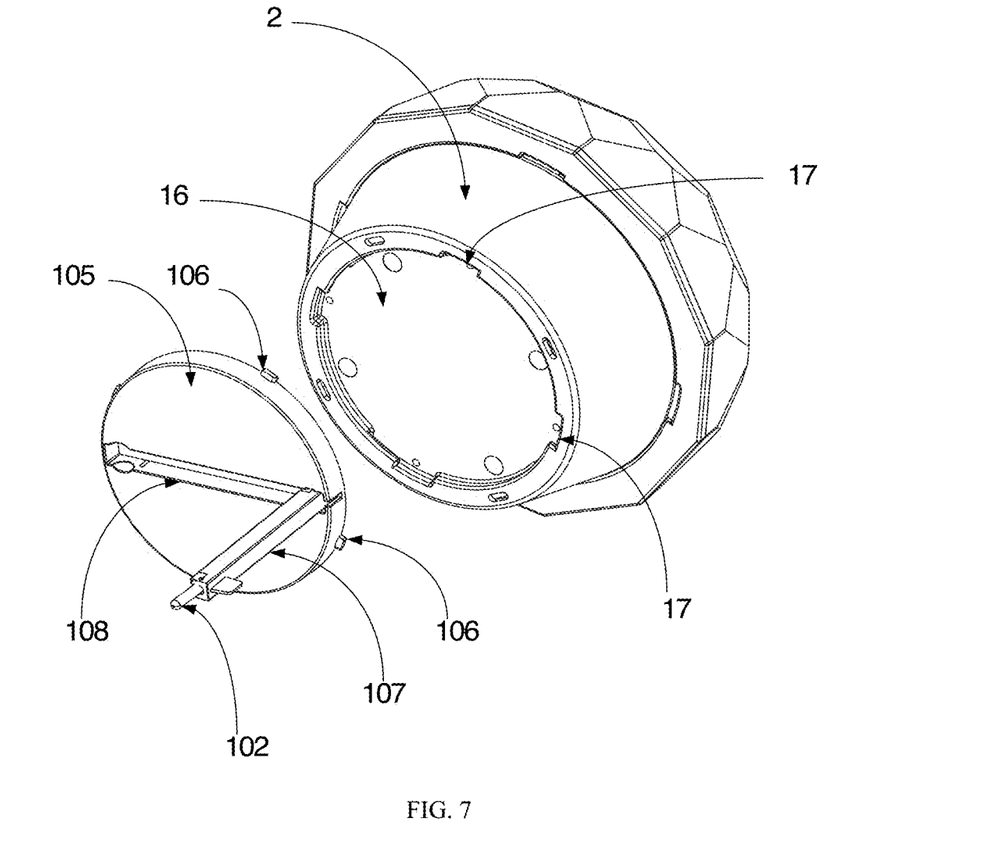
FIG. 7 is a schematic structural view in a case where the water temperature probe is mounted on a second connecting base according to one embodiment of the invention.

Third, in a case where the water temperature probe 102 is detachably mounted in the lower lampshade 2, the water temperature probe 102 is connected to a second connecting base 105 mounted in the second socket 16.

Wherein, third lumps 106 are arranged on the periphery of the first connecting base 104 and the periphery of the second connecting base 105, and by rotation, the third lumps 106 on the first connecting base 104 are respectively clamped in the first slots 14, and the third lumps 106 on the second connecting base 105 are clamped in the second slots 17. Of course, in a case where the first connecting base 104 and the second connecting base 105 are respectively mounted in the first socket 13 and the second socket 16, the lower lampshade 2 or the tube 4 that is originally mounted here should be detached, correspondingly. By means of detachable assembly, the water temperature probe 102 may be electrically connected to the circuit board 5 by means of a waterproof plug. Of course, this is not the unique connection method, other connection methods may be adopted as long as pluggable and waterproof connection between the water temperature probe 102 and the circuit board 5 can be realized, and this embodiment has no limitation in this aspect. The first connecting base and the second connecting base may be detachably assembled by means of threads.

Moreover, in this embodiment, a mounting rod 107 is hinged to each of the first connecting base 104 and the second connecting base 105, a mounting groove (not shown) for fixing and mounting the water temperature probe 102 is formed in the mounting rod 107, the water temperature probe 102 is fixed and mounted in the mounting groove, and the probe portion of the water temperature probe 102 is arranged outside the mounting groove. A receiving groove 108 is formed in a position, corresponding to the mounting rod 107, of each of the first connecting base 104 and the second connecting base 105, the water temperature probe 102 is rotated to be received in the receiving groove 108, and a grip portion 109 to be held by users is arranged on the end surface of the mounting rod 107. In this way, the water temperature probe 102 can be stored and protected; when rotated to be unfolded, the water temperature probe 102 can stretch deeper in water, such that the water temperature detected by the water temperature probe 102 is closer to the actual water temperature.

In addition, the whole disinfection lamp may be controlled by keys or an infrared remote control, and this embodiment has no limitation in this aspect.

The above embodiments are merely preferred ones of the invention and are not intended to limit the patent scope of the invention. All equivalent structures or flow transformations made according to the description and the accompanying drawings, or direct or indirect applications to other related technical fields should also fall within the patent protection scope of the invention.

What is claimed is:

1. A disinfection device for swimming pool water comprising:
    a disinfection lamp including:
        an upper lampshade (1);
        a lower lampshade (2);
        a lens lampshade (3);
    a tube (4) capable of holding sustained release chlorine tablets, detachably mounted to a bottom of the lower lampshade (2), water holes (1) are formed in the tube (4) and the lower lampshade (3), for placing swimming pool water in fluid communication with any sustained release chlorine tablets within the tube (4);
    a circuit board (5) and a battery (6) electrically connected to the circuit board (5) are mounted on the lens lampshade (3);
    a solar panel (7) is mounted on a top surface of the upper lampshade (1) and electrically connected to the circuit board (5);
    a light diffuser (9) is arranged at a bottom of the lens lampshade (3);
    a first light bead (8) is arranged on a lower surface of the circuit board (5) and within the light diffuser (9);
    an exhaust gap disposed between the lower lampshade (2) and the lens lampshade (3);
    wherein, the upper lampshade (1) covers the lens lampshade (3) and is sealingly connected to the lens lampshade (3); and
    wherein, the lower lampshade (2) is mounted at the bottom of the lens lampshade (3) and wraps around the light diffuser (9).

2. The disinfection device for swimming pool water of claim 1, further comprising:
    a reflection cup (101) is arranged upside down in the lower lampshade (2) and located below the light diffuser (9), and an outer end surface of the reflection cup (101) is a reflecting surface, such that light refracted out of the light diffuser is reflected by the reflection cup and diffused around.

3. The disinfection device for swimming pool water of claim 1, further comprising:
    a second light bead is arranged on the circuit board and faces the upper lampshade; the lower lampshade is a scutate light diffuser, and a diamond pattern is arranged on the surface of the upper lampshade; the first light bead and the second light bead includes colored RGB light beads.

4. The disinfection device for swimming pool water of claim 1, wherein, foam (100) is mounted around the lens lampshade (3) promoting buoyancy.

5. The disinfection device for swimming pool water of claim 1, wherein first lumps (12) are arranged along an opening of the lower lampshade, a first socket (13) allowing the opening of the lower lampshade to be inserted therein, is arranged at the bottom of the lens lampshade, L-shaped first slots (14) are formed in a wall of the first socket, the opening of the lower lampshade is inserted into the first socket (13) and is rotated to lock the first lumps (12) in the first slots (14), and exhaust gaps are disposed between the first lumps and the first slots.

6. The disinfection device for swimming pool water of claim 1, wherein second lumps (15) are arranged along an end opening of the tube, a second socket (16) allowing the end opening of the tube to be inserted therein, is arranged at the bottom of the lower lampshade, L-shaped second slots (17) are formed in a wall of the second socket, and the end opening of the tube is inserted into the second socket and is rotated to lock the second lumps in the second slots.

7. The disinfection device for swimming pool water of claim 6, wherein the tube (4) comprises two semi-cylinders, one end of the semi-cylinders are connected by means of a bent portion, and the other end of the semi-cylinders are connected by means of hasps; lower ends of the semi-cylinders are sleeved with a cover, and receding holes are formed in positions, corresponding to the water holes, of the cover.

8. The disinfection device for swimming pool water of claim 7, further comprising:
    a water temperature probe (102), wherein the water temperature probe is mounted on the lens lampshade or detachably mounted on the lens lampshade or the lower lampshade, a display screen (103) for displaying a temperature value is inlaid in the upper lampshade, which is transparent, and the water temperature probe and the display screen are electrically connected to the circuit board.

9. The disinfection device for swimming pool water of claim 8, wherein:
    when the water temperature probe is fixedly mounted on the lens lampshade, a probe portion of the water temperature probe is arranged at the bottom of the lens lampshade and located in the lower lampshade;

when the water temperature probe is detachably mounted on the lens lampshade, the water temperature probe is connected to a first connecting base mounted in the first socket;

when the water temperature probe is detachably mounted in the lower lampshade, the water temperature probe is connected to a second connecting base mounted in the second socket.

10. The disinfection device for swimming pool water of claim 9, wherein, third lumps (106) are arranged on a periphery of the first connecting base and a periphery of the second connecting base, and by rotation, the third lumps on the first connecting base are respectively clamped in the first slots, and the third lumps on the second connecting base are clamped in the second slots.

11. The disinfection device for swimming pool water of claim 10, wherein a mounting rod is hinged to each of the first connecting base and the second connecting base, a mounting groove for fixing and mounting the water temperature probe is formed in the mounting rod, the water temperature probe is fixed and mounted in the mounting groove, and the probe portion of the water temperature probe is arranged outside the mounting groove; a receiving groove is formed in a position, corresponding to the mounting rod, of each of the first connecting base and the second connecting base, the water temperature probe is rotated to be received in the receiving groove, and a grip portion to be held by users is arranged on an end surface of the mounting rod.

* * * * *